United States Patent [19]
DuLac

[11] Patent Number: 5,899,582
[45] Date of Patent: *May 4, 1999

[54] MOVIE-ON-DEMAND DISK STORAGE LOOP ARCHITECTURE

[75] Inventor: Keith B. DuLac, Derby, Kans.

[73] Assignee: Hyundai Electronics America, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,821

[22] Filed: Jan. 30, 1997

Related U.S. Application Data

[63] Continuation of application No. 08/287,554, Aug. 8, 1994, abandoned.

[51] Int. Cl.[6] .............................. H04N 5/381; H04N 5/85; H04N 5/90; H04N 7/10
[52] U.S. Cl. .................................. 386/125; 348/7; 348/13
[58] Field of Search ............................... 360/33.1; 348/7, 348/13, 12–15; 371/10.1; 340/747; 386/1, 15, 33, 35, 46, 125; 711/100; 395/490, 478; H04N 5/76, 5/781, 5/92

[56] References Cited

U.S. PATENT DOCUMENTS

| | | | |
|---|---|---|---|
| 4,646,075 | 2/1987 | Andrews et al. | 340/747 |
| 4,792,848 | 12/1988 | Nussrallah et al. | 358/86 |
| 5,027,400 | 6/1991 | Baji et al. | 380/20 |
| 5,045,940 | 9/1991 | Peters et al. | 358/143 |
| 5,148,432 | 9/1992 | Gordon et al. | 371/10.1 |
| 5,206,722 | 4/1993 | Kwan | 358/86 |
| 5,414,455 | 5/1995 | Hooper et al. | 348/7 |

FOREIGN PATENT DOCUMENTS

| | | | |
|---|---|---|---|
| 0625858 | 5/1993 | European Pat. Off. | H04N 7/173 |
| 0576136 | 12/1993 | European Pat. Off. | H04L 1/00 |

OTHER PUBLICATIONS

Lougher et al., The Impact of Digital Audio & Video on High Speed Storage, IEEE '94 pp. 84–89.
Lougher et al. The Design of a Storage Server for Continuous Media, Computer Journal 1992/93.
Ann Drapeau et al., RAID–II A High–Bandwidth Network File Server, IEEE, pp: 234–244, 1994.
System Architecture for a Large Scale Video on Demand Service; W.D. Sincoskie; Sep. 22, 1991; pp. 155–161.
Video–on–Demand System Using Optical Mass Storage System; Tatsuo Mori et al.; Nov. 1993; pp. 5433–5438.

*Primary Examiner*—Douglas W. Olms
*Assistant Examiner*—David R. Vincent
*Attorney, Agent, or Firm*—Townsend and Townsend and Crew

[57] ABSTRACT

A digital video storage system, suitable for use within a movie-on-demand (MOD) system, includes a plurality of disk drive storage devices; the disk drives being connected together serially to form a loop, wherein each disk drive within the loop has an input for receiving digital video data for storage and an output for providing stored digital video data, the output of each disk drive being connected to the input of the succeeding disk drive in the loop. Successive segments of a video program, stored on successive disk drives in the loop, are each repeatedly moved at a predefined time interval from the disk drive on which the segments are currently stored to the succeeding disk drive in the loop. A plurality of taps are connected to the loop to provide connection points for MOD subscribers or viewers for receiving the video program from the loop. Each tap corresponds to the output of one of the plurality of disk drives. During operation, the video program is provided at each tap, however at any instant each tap is providing a different segment of the video program. The system also includes means for changing the tap to which a MOD subscriber or viewer is connected in response to a request received from the viewer. This feature allows the MOD subscriber to pause, play, or to jump forward or backward in time to the beginning of any movie segment, simulating the operation of a VCR or video disk player.

14 Claims, 3 Drawing Sheets

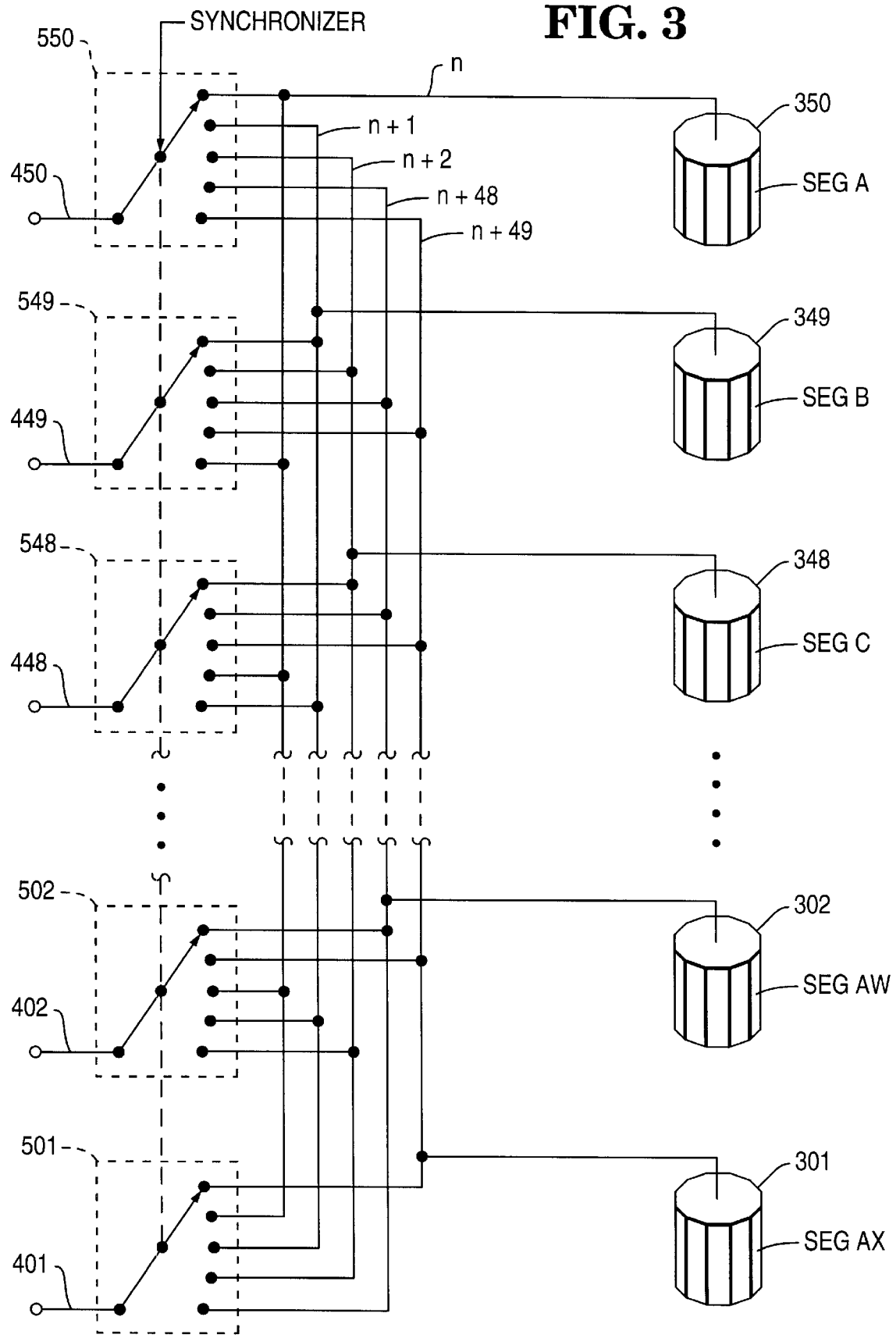

MOVIE-ON-DEMAND DISK STORAGE LOOP ARCHITECTURE

This is a continuation of application Ser. No. 08/287,554 filed Aug. 8, 1994, now abandoned.

The present invention relates to video storage systems and, more particularly, to digital movie on demand services.

BACKGROUND OF THE INVENTION

The digital video market is among the earliest markets to develop out of the emerging multimedia business. The applications of digital video will first appear in movie-on-demand (MOD) services, which enable viewers to call up particular movies or other video programs whenever they want to watch them. Most present day movie request systems are analog rather than digital having fixed movie start times.

Digital movie-on-demand programs may be provided from a centralized location for a large number of users or can be provided "downstream" at Local Exchange companies or Cable Companies. Movie-on-demand services are expected to be among the most popular interactive multimedia offerings on the electronic information superhighway.

A network providing movie-on-demand services, upon receipt from a MOD customer of a signal requesting to view a movie, must verify the request and set up necessary connections to a video storage server. To the customer, the MOD service should desirably operate in a manner similar to that of a typical VCR or laser disc player, providing features such as pause, fast forward, stop, and rewind. Ideally, the requested movie should be accessible immediately, or within one to two minutes from the time the request was entered.

The storage requirements for digital video are great. Storage requirements for a single movie, depending upon picture quality, compression ratio and length of the movie can vary from 1 gigabyte (GB) to 3 GB. Typically, a standard quality VHS movie 100 minutes long will require 1 GB of storage. Movies developed for High Definition TV may require storage capacities of 33 GB per movie. Early MOD systems that utilize this type of video/audio storage are targeted to accommodate approximately 1600 users, while later systems may provide service to 10,000 users per video server.

The video server must be able to access the video information delayed by one or two minutes and multiples thereof for the length of the movies and update all users in a specified real-time window. The delay allows customers to jump forward or backward in time, simulating the operation of a VCR or video disk player. In order to provide acceptable performance, many early video server implementations utilize large amounts of fast Dynamic Random Access Memory (DRAM); up to 60 GB per server at approximately $25/megabyte (MB).

OBJECTS OF THE INVENTION

It is an object of the present invention to provide a new and useful video storage system for movie on demand services.

It is another object of the present invention to provide such a system which utilizes disk storage rather than Dynamic Random Access Memory, resulting in a substantial reduction in storage costs.

It is yet another object of the present invention to provide a new and useful video data storage system for movie-on-demand (MOD) applications whereby a requested video program is available to an MOD subscriber or viewer immediately, or within one to two minutes from the time the request was entered.

It is still a further object of the present invention to provide a new and useful video data storage system for movie-on-demand (MOD) applications providing pause, play, fast forward and reverse functionality to a MOD subscriber or viewer, simulating the operation of a VCR or video disk player.

SUMMARY OF THE INVENTION

There is provided, in accordance one embodiment of the present invention, a digital video storage system, suitable for use within a movie-on-demand (MOD) system, comprising a plurality of disk drive storage devices; the disk drives being connected together serially to form a loop, wherein each disk drive within the loop has an input for receiving digital video data for storage and an output for providing stored digital video data, the output of each disk drive being connected to the input of the succeeding disk drive in the loop. Successive segments of a video program, stored on successive disk drives in the loop, are each repeatedly moved at a predefined time interval from the disk drive on which the segments are currently stored to the succeeding disk drive in the loop. A plurality of taps are connected to the loop to provide connection points for MOD subscribers or viewers for receiving the video program from the loop. Each tap corresponds to the output of one of the plurality of disk drives. During operation, the video program is provided at each tap, however at any instant each tap is providing a different segment of the video program.

In the described embodiment, means are also provided for changing the tap to which a MOD subscriber or viewer is connected in response to a request received from the viewer. This feature allows the MOD subscriber to pause, play, or to jump forward or backward in time to the beginning of any movie segment, simulating the operation of a VCR or video disk player. For a 100 minute long movie divided into 50 two-minute segments on a loop including 50 disk drive storage devices, the subscriber, by changing taps, could move forward or backward through the movie in two-minute increments.

The above and other objects, features, and advantages of the present invention will become apparent from the following description and the attached drawings.

BRIEF DESCRIPTION OF THE DRAWINGS

FIG. 3 is a block diagram illustration of a disk storage architecture including multiple, discrete, disk drives for storing and playing digital video in accordance with a second embodiment of the present invention.

DETAILED DESCRIPTION OF THE PREFERRED EMBODIMENT

Figure 1:
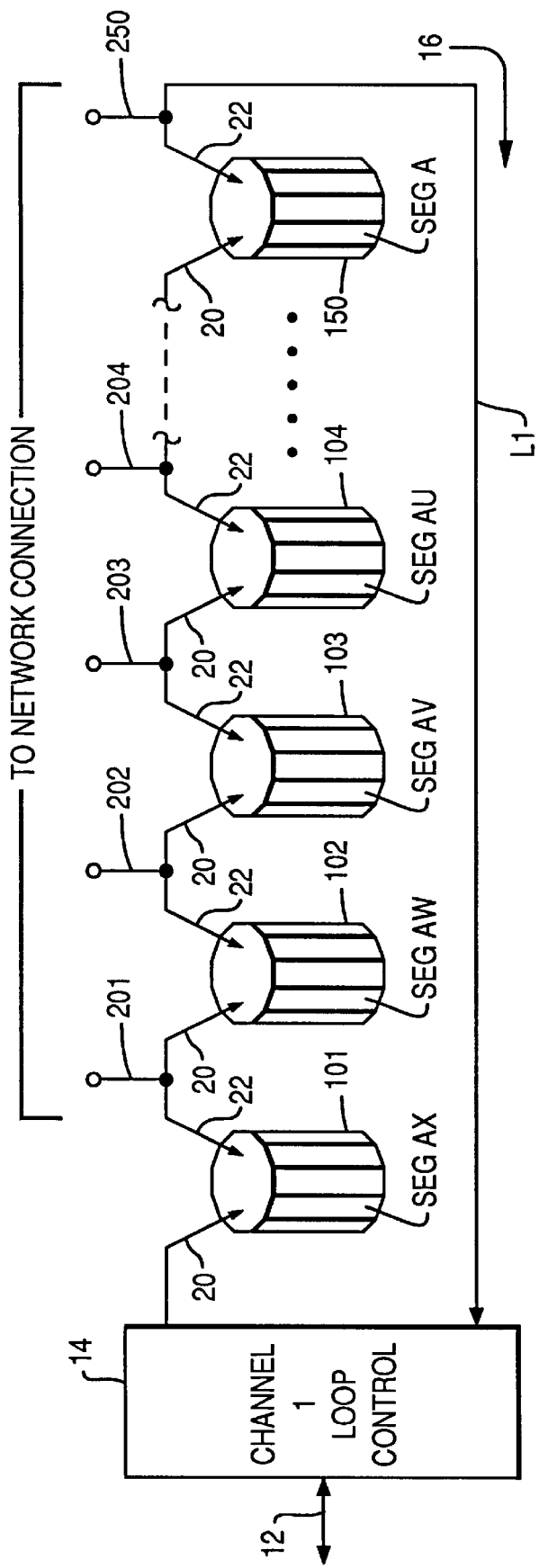
FIG. 1 is a block diagram illustration of a disk storage architecture including multiple disk drives arranged in a loop for storing and playing digital video in accordance with a first embodiment of the present invention.

Referring now to FIG. 1, there is seen a disk storage architecture for storing and playing movie-on-demand digital video in accordance with a first embodiment of the present invention. The disk storage architecture includes a multitude of disk drives, identified by reference numerals 101 through 150, connected together serially in a loop L1. To each one of disk drives 101 through 150 an output tap, identified by reference numerals 201 through 250, respectively, is provided. These taps provide network connections for MOD subscribers.

The disk loop architecture of FIG. 1 further includes a high speed network connection 12 to a loop control unit 14 that functions to download movies from a distribution center, not shown; initialize the disk drive storage elements 101 through 150, and to move the outputs of each disk drive storage element via taps 201 through 250 to a network connection.

A movie saved to the above-described MOD system is divided into successive one or two minute segments, and the successive movie segments stored on successive disk drive storage elements along the loop. For example, a movie having a length of 100 minutes long can be divided into 50 segments, each having a length of 2 minutes. FIG. 1 shows such a movie, having 50 segments identified by reference letters A through AX, initialized on loop L1 with the starting segment A on disk element 150, second segment B on disk element 149 through the last four segments AU, AV, AW and AX of the movie on disk element 104, 103, 102 and 101, respectively.

Video subscribers are connected to the MOD system through taps 201 through 250. Multiple users may be connected to each tap or to separate taps, the movie being delayed in time by the total duration of all the video segments stored in the intervening disk storage elements located between the separate taps.

In operation, a movie is viewed by simultaneously shifting the movie segments out of each disk drive storage element and into the succeeding disk drive element along loop L1. As the segments are shifted out of the disk drive storage elements 101 through 150, they are also provided via taps 201 through 250, respectively, to the video subscribers connected to the system. This process continues at fixed intervals until the entire movie has been played through the loop, and may be continued indefinitely with the movie playing repeatedly through the loop. For a 100 minute movie, the entire movie will pass through each disk drive storage element 101 through 150 and each tap 201 through 250 during a 100 minute period, although each disk drive storage element and tap will start at a different movie segment.

Table 1 provided below shows the segment contents of disks 101 through 150, taps 201 through 250, at two minute intervals for a 100 minute movie divided into 50 segments, A through AX, with movie play beginning a time 0 minutes.

Referring to the above table, at time 0 minutes segments A through AX are viewed on taps 250, 249, 248, . . . , 203, 202 and 201, respectively. Two minutes later, segment A will be provided at tap 201, segment B at tap 250, segment C at tap 249, and so on. At time 100 min. the movie will repeat. The fast forward and reverse functions are accomplished by moving the viewer/subscriber from their present tap to other taps on the loop.

The taps 201, 202, 203 through 250 are points of data stream access as the digital movie is shifted from disk drive elements 101 to 102 to 103 through 250, respectively. The data at the taps may be in a serial or parallel form. Buffers, not shown, are provided at each tap to smooth the data stream transfer and remove jitter from the data for display. The buffer size could range from a few kilobytes for frame buffers to a few megabytes, depending on the sophistication of the MOD subscriber's display controller. A FIFO or rotating buffer scheme in conjunction with mapping of the Disk Interface Standard (e.g. SCSI) to a network standard (ATM) function allows the disk streams to be interfaced to the network transport/switching complex.

The system as described above permits the MOD subscriber to pause, play, or to jump forward or backward in time to the beginning of any movie segment, simulating the operation of a VCR or video disk player, by changing the tap to which the subscriber is connected. For a 100 minute long movie divided into 50 two-minute segments, the subscriber, by changing taps, could move forward or backward through the movie in two-minute increments.

The amount of disk storage per movie is the total of the storage provided by each of storage elements 101 through 150. As stated above, a standard quality VHS movie 100 minutes long typically will require approximately one gigabyte of storage. A conventional MOD scheme could require one gigabyte storage per delay element with shifting accomplished by delaying the start of each storage element relative to the previous element. A standard quality 100 minute movie played on the MOD system of the present invention having 50 storage elements would require only 20 megabyte per storage element. The amount of total storage required for the movie would remain the same for one subscriber or for a large number of subscribers.

The present invention also allows for multiple movies in a loop such that each storage element could contain several movies. If each movie requires 20 megabyte per storage element, a system utilizing 500-megabyte disk drives as storage elements would allow up to 25 movies per loop (500 MB/20 MB per movie=25 movies).

Figure 2:
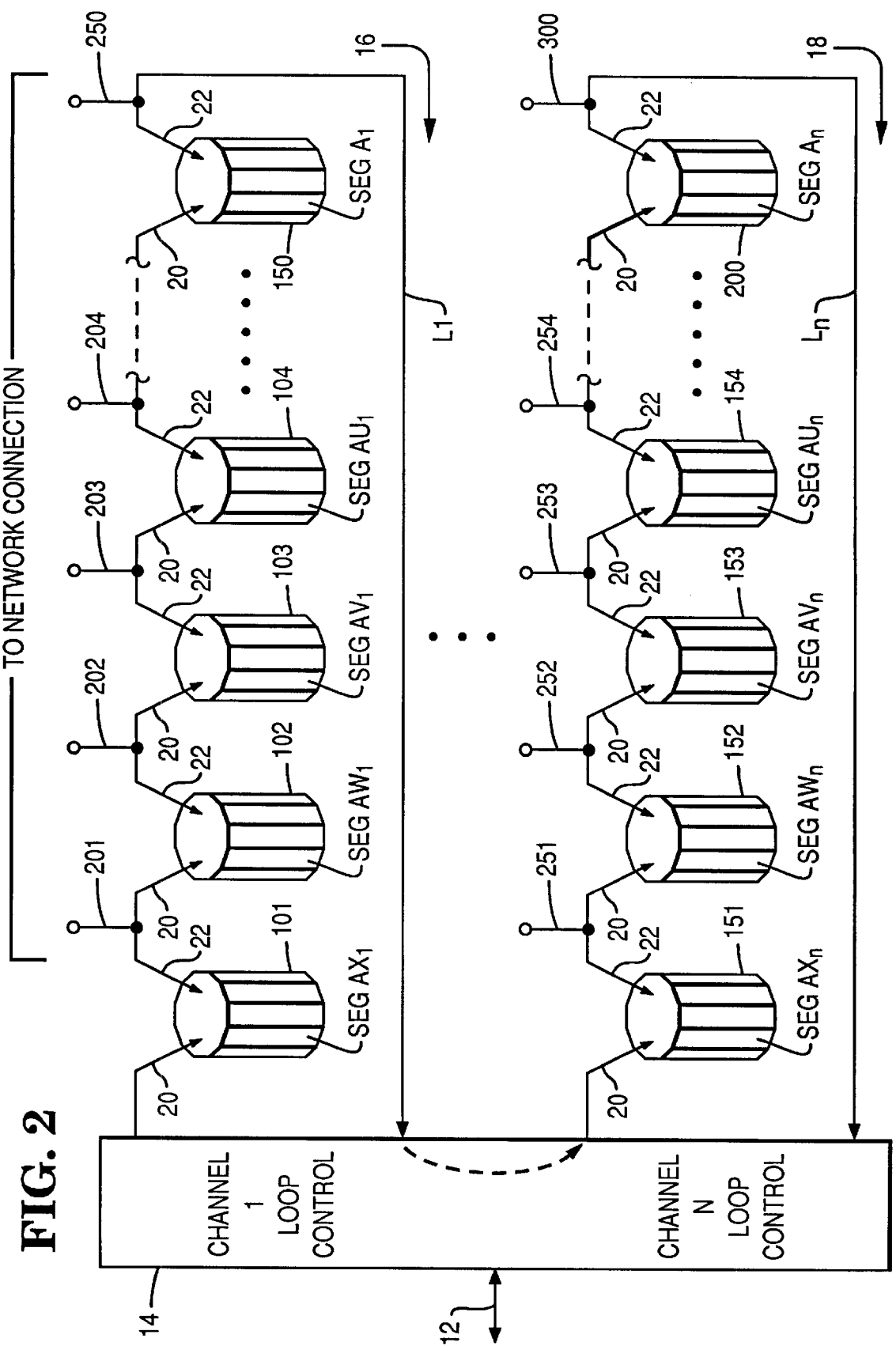
FIG. 2 is a block diagram illustration of a disk storage architecture including multiple disk loops similar to that shown in FIG. 1

The MOD system of the present invention can be constructed with multiple loops L1 through Ln as shown in FIG. 2. The loops can be implemented with either serial or

TABLE 1

|         | 0 min | 2 min | 4 min | 6 min | • | • | 96 min | 98 min | 100 min. |
|---------|-------|-------|-------|-------|---|---|--------|--------|----------|
| Tap 201 | AX    | A     | B     | C     | • | • | AV     | AW     | AX       |
| Tap 202 | AW    | AX    | A     | B     | • | • | AU     | AV     | AW       |
| Tap 203 | AV    | AW    | AX    | A     | • | • | AT     | AU     | AV       |
| •       | •     | •     | •     | •     | • | • | •      | •      | •        |
| •       | •     | •     | •     | •     | • | • | •      | •      | •        |
| Tap 247 | D     | E     | F     | G     | • | • | B      | C      | D        |
| Tap 248 | C     | D     | E     | F     | • | • | A      | B      | C        |
| Tap 249 | B     | C     | D     | E     | • | • | AW     | AX     | A        |
| Tap 250 | A     | B     | C     | D     | • | • | AW     | AX     | A        | parallel connections, loop control unit 14 providing the switching necessary to serially connect multiple loops. Connecting two loops in series permits the playing of a movie having more segments than can be accommodated on a single loop. A movie may have more segments than can be accommodated on a single loop when the movie length is great, or the segment length is small, e.g. one minute long rather than two minutes in length.

The present invention may also be implemented as shown in FIG. 3. The disk storage architecture of FIG. 3 also includes a multitude of disk drives, identified by reference numerals 301 through 350. However, the drives are not connected together serially into a loop. A multitude of output taps, identified by reference numerals 401 through 450 are also provided, provide network connections for MOD subscribers. Each output tap 401 through 450 is connected through a corresponding switch, identified by reference numerals 501 through 550, to all disk drives.

In the system as shown in FIG. 3, each switch includes fifty positions. The first position of each one of switches 501 through 550 connects to a corresponding one of drives 301 through 350. The second position of each one of switches 501 through 550 connects to a corresponding one of drives 350 and 301 through 349. The third position of each one of switches 501 through 550 connects to a corresponding one of drives 349, 350 and 301 through 348. The remaining switch positions are connected to the disk drives in accordance with the pattern described for the first, second and third switch positions. The operation of switches 501 through 550 is synchronized so that all switches operate simultaneously and at any selected time each tap is connected to a different disk drive.

As with the MOD disk loop architecture of FIG. 1, a movie saved to the MOD disk storage architecture of FIG. 3, is divided into successive one or two minute segments, and the successive movie segments stored on successive disk drive storage elements. FIG. 3 shows such a movie, having 50 segments identified by reference letters A through AX, stored on disk drives 350, 349, 348, . . . , 303, 302 and 301, respectively.

In operation, a movie is viewed by simultaneously reading the movie segments stored on each of the disk drive storage elements and providing the segments via switches 501 through 550 and taps 401 through 450 to the video subscribers connected to the output taps. Following the read of each segment, switches 501 through 550 are incremented by one position so that the succeeding movie segments will be provided to the output taps. This process continues at fixed intervals until the entire movie has been played through each tap, and may be continued indefinitely with the movie playing repeatedly through each tap.

At time=t min., an MOD subscriber connected to tap 450 of the system shown in of FIG. 3 will view segment A, read from disk drive 350 through switch 550. Two minutes later at time=t+2 minutes (assuming each movie segment has a length of two minutes) the viewer at tap 450 will have been connected through switch 550 with disk drive 349 to view the second segment, segment B, of the movie. Switch 550 will increment every two minutes to provide the entire movie to the MOD subscriber connected to tap 450. Each of switches 501 through 549 will operate in a similar manner as switch 550, to provide the movie to subscribers connected to taps 401 through 449, respectively, although each subscriber connected to a different tap will begin movie viewing at a different start time or at a different movie segment.

The MOD system as shown in FIG. 3 does not require the actual movement of video data from disk element to disk element as the implementation shown in FIG. 1. The timing for FIG. 3 is also shown in Table 1.

The system shown in FIG. 3 also permits the MOD subscriber to pause, play, or to jump forward or backward in time to the beginning of any movie segment, simulating the operation of a VCR or video disk player, by changing the tap to which the subscriber is connected. For a 100 minute long movie divided into 50 two-minute segments, the subscriber, by changing taps, could move forward or backward through the movie in two-minute increments.

It can thus be seen that there has been provided by the present invention a video storage system for movie on demand (MOD) services whereby a requested video program is available to an MOD subscriber or viewer immediately, or within one to two minutes from the time the request was entered. Additionally the system provides to the subscriber pause, play, fast forward and reverse functionality, simulating the operation of a VCR or video disk player.

Although the presently preferred embodiment of the invention has been described, it will be understood that various changes may be made within the scope of the appended claims.

What is claimed is:

1. A digital video storage system comprising:

a plurality of disk drive storage devices;

said disk drives being connected together to form a loop, wherein each disk drive within said loop has an input for receiving digital video data for storage and an output, different than the input, for providing stored digital video data, the output of each disk drive being connected to the input of the succeeding disk drive in said loop, with successive disk drives in said loop having successive segments of a video program stored thereon;

a plurality of taps connected to said loop providing connection points for a viewer receiving said video program from said loop, each tap corresponding to the output of one of said plurality of disk drives; and means for changing the tap to which said viewer is connected in response to a request received from said viewer.

2. The digital video storage system in accordance with claim 1, wherein:

said video segments are equal in duration.

3. A digital video storage system comprising:

a plurality of disk drive storage devices, each disk drive having stored thereon a different segment of a video program; and a plurality of switches, each switch having an output tap and being connected to each one of said plurality of disk drives for selectively routing video segments read from said disk drives to said output tap;

each switch being operated at a predefined time interval to successively provide each segment of said video program at its output tap;

said switches are operated synchronously, each switch providing a different segment of said video program at its output tap;

wherein said switch output taps provide connection points for a viewer receiving said video program from said loop; and means for changing the tap to which said viewer is connected in response to a request received from said viewer.

4. The digital video storage system in accordance with claim 3, wherein:

said video segments are equal in duration; and said predefined time interval is equivalent to the duration of said video segments.

5. A method for storing and viewing video data, comprising the steps of:

providing a plurality of disk drive storage devices;

said disk drives being connected together to form a loop, wherein each disk drive within said loop has an input for receiving digital video data for storage and an output, different than the input, for providing stored digital video data, the output of each disk drive being connected to the input of the succeeding disk drive in said loop, said loop including a plurality of taps connected thereto providing connection points for a viewer receiving said video program from said loop, each tap corresponding to the output of one of said plurality of disk drives; storing successive segments of a video program on successive disk drives in said loop;

repeatedly moving said segments, at a predefined time interval, from the disk drive on which the segments are currently stored to the succeeding disk drive in said loop; and changing the tap to which said viewer is connected in response to a request received from said viewer.

6. The method in accordance with claim 5, wherein:

said video segments are equal in duration; and said predefined time interval is equivalent to the duration of said video segments.

7. A method for storing and viewing video data, comprising the steps of:

providing a plurality of disk drive storage devices;

storing successive segments of a video program on different disk drives within said plurality of disk drives;

providing a plurality of switches, each switch having an output tap and being connected to each one of said plurality of disk drives for selectively routing video segments read from said disk drives to said output tap, said output taps providing connection points for a viewer receiving said video program;

repeatedly operating each switch, at a predefined time interval, to successively provide each segment of said video program at its output tap;

operating said switches synchronously, each switch providing a different segment of said video program at its output tap; and changing the tap to which said viewer is connected in response to a request received from said viewer.

8. The method in accordance with claim 7, wherein:

said video segments are equal in duration; and said predefined time interval is equivalent to the duration of said video segments.

9. A digital video storage system comprising:

a plurality of disk drive storage devices;

said disk drives being connected together to form a loop, wherein each disk drive within said loop has an input for receiving digital video data for storage, and an output for providing stored digital video data while receiving digital video data at the input, the output of at least one disk drive being connected to the input of a succeeding disk drive in said loop, with successive disk drives in said loop having successive segments of a video program stored thereon;

a plurality of taps connected to said loop providing connection points for a viewer receiving said video program from said loop, each tap corresponding to the output of one of said plurality of disk drives; and means for changing the tap to which said viewer is connected in response to a request received from said viewer.

10. The digital video storage system in accordance with claim 9, further comprising a loop controller having a controller input and controller output, with one of the plurality of disk drive storage devices having its input coupled to the controller output, and another of the plurality of disk drive storage devices having its output coupled to the controller input.

11. A method for operating the digital video storage system of claim 9, comprising the step of repeatedly moving said video segments at a predefined time interval from the disk drive on which the segments are currently stored to the succeeding disk drive in said loop.

12. The digital video storage system in accordance with claim 11, wherein said video segments are equal in duration; and said predefined time interval is equivalent to the duration of said video segments.

13. A method for operating the digital video storage system of claim 1, comprising the step of repeatedly moving said video segments at a predefined time interval from the disk drive on which the segments are currently stored to the succeeding disk drive in said loop.

14. The method of claim 13, wherein said predefined time interval is equivalent to the duration of said video segments.

* * * * *